(12) United States Patent
Wolfson et al.

(10) Patent No.: US 11,361,247 B2
(45) Date of Patent: Jun. 14, 2022

(54) SPATIAL DEVICE CLUSTERING-BASED EMERGENCY RESPONSE FLOOR IDENTIFICATION

(71) Applicant: International Business Machines Corporation, Armonk, NY (US)

(72) Inventors: Charles D. Wolfson, Austin, TX (US); Otis Smart, Duluth, GA (US); Harikumar Venkatesan, Santa Clara, CA (US); Sushain Pandit, Austin, TX (US); David A. Selby, Nr Fareham (GB); Brent Gross, Calgary (CA); Corey A. Stubbs, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 16/148,952

(22) Filed: Oct. 1, 2018

(65) Prior Publication Data

US 2020/0104755 A1 Apr. 2, 2020

(51) Int. Cl.
*G06N 20/00* (2019.01)
*G06F 16/28* (2019.01)

(52) U.S. Cl.
CPC .......... *G06N 20/00* (2019.01); *G06F 16/285* (2019.01)

(58) Field of Classification Search
None
See application file for complete search history.

(56) References Cited

U.S. PATENT DOCUMENTS

| 7,126,951 | B2 | 10/2006 | Belcea et al. |
| 7,203,497 | B2 | 4/2007 | Belcea |
| 7,233,781 | B2 | 6/2007 | Hunter et al. |
| 7,525,426 | B2 | 4/2009 | Edelstein et al. |
| 7,885,902 | B1 | 2/2011 | Shoemaker et al. |
| 8,032,480 | B2 | 10/2011 | Pinckney et al. |

(Continued)

FOREIGN PATENT DOCUMENTS

| GB | 2541649 A | 3/2017 |
| GB | 2542267 A | 3/2017 |

OTHER PUBLICATIONS

IBM, List of IBM Patents or Patent Applications Treated as Related, Applicant Appendix, Oct. 1, 2018, pp. 1-2, the contents of which are incorporated herein by reference in their entirety.

(Continued)

*Primary Examiner* — David R Vincent
(74) *Attorney, Agent, or Firm* — William H. Hartwell (57) ABSTRACT

Historical device positioning data captured from one or more devices over a period of time is received. The historical device positioning data includes historical latitude, longitude, and elevation data of the one or more devices. Building boundaries for a give building are identified based upon the historical latitude and longitude data. The historical device positioning data corresponding to locations within the building boundaries of the building is clustered using a machine learning-based clustering algorithm, resulting in clusters with corresponding cluster centroids. The cluster centroids are associated with respective floors within the building. A current floor of the building on which a specific device is located is determined by mapping current device positioning data of the specific device to the closest cluster centroid.

20 Claims, 6 Drawing Sheets

(56) References Cited

U.S. PATENT DOCUMENTS

| | | | |
|---|---|---|---|
| 8,990,043 | B1 | 3/2015 | Kolodziej |
| 9,053,624 | B2 | 6/2015 | Bentley |
| 9,116,230 | B2 | 8/2015 | Vartanian et al. |
| 9,167,389 | B1 | 10/2015 | Murchison et al. |
| 9,439,165 | B2 | 9/2016 | Azami |
| 9,838,850 | B2 | 12/2017 | Hurberman et al. |
| 9,936,342 | B2 | 4/2018 | Huang et al. |
| 10,393,854 | B1 | 8/2019 | Wolfson |
| 10,408,914 | B1 | 9/2019 | Wolfson |
| 10,631,129 | B1 | 4/2020 | Pandit |
| 2006/0194588 | A1 | 8/2006 | Zhao |
| 2013/0141233 | A1 | 6/2013 | Jacobs et al. |
| 2014/0039840 | A1 | 2/2014 | Yuen et al. |
| 2015/0257014 | A1 | 9/2015 | Ahmed |
| 2016/0140440 | A1 | 5/2016 | Hsueh et al. |
| 2017/0111000 | A1 | 4/2017 | Saito et al. |
| 2017/0311131 | A1* | 10/2017 | South ............... H04W 4/029 |
| 2018/0352041 | A1* | 12/2018 | Tasdemiroglu ....... H04W 12/02 |
| 2020/0027265 | A1* | 1/2020 | Levy ............... G01S 5/0252 |
| 2020/0107159 | A1 | 4/2020 | Pandit |
| 2020/0107160 | A1 | 4/2020 | Pandit |

OTHER PUBLICATIONS

Alex Varshavsky, et al., The SkyLoc Floor Localization System, In Proceedings of the Fifth Annual IEEE International Conference on Pervasive Computing and Communications (PerCom'07), Mar. 2007, pp. 1-10, IEEE Computing Society, White Plains, NY, USA.

Firas Alsehly, et al., Indoor positioning with floor determination in Multi Story Buildings, In Proceedings of the 2011 International Conference on Indoor Positioning and Indoor Navigation, Sep. 2011, pp. 1-7, IEEE Computing Society, Guimaraes, Portugal.

Andrew N. Seybold, Public Safety Advocate: Location Services, When?, Jul. 13, 2017, pp. 1-4, Andrew Seybold, Inc., Published at: http://allthingsfirstnet.com/public-safety-advocate-location-services-when/.

Rafal Gorak, et al., Indoor Localisation Based on GSM Signals: Multistorey Building Study, Mobile Information Systems, Jan. 2016, pp. 1-17, vol. 2016, Hindawi Publishing Corporation, Published at: http://dx.doi.org/10.1155/2016/2719576.

IBM, "List of IBM Patents or Patent Applications Treated as Related", Appendix P, 2 pages, dated Nov. 14, 2019.

Mell et al., "The NIST Definition of Cloud Computing", Recommendations of the National Institute of Standards and Technology, Special Publication 800-145, Sep. 2011, 7 pages.

Pandit et al., "First Responder Feedback-Based Emergency Response Floor Identification", U.S. Appl. No. 16/148,967, filed Oct. 1, 2018, 48 pages.

Pandit et al., "First Responder Feedback-Based Emergency Response Floor Identification", U.S. Appl. No. 16/681,959, filed Nov. 13, 2019, 51 pages.

\* cited by examiner

SPATIAL DEVICE CLUSTERING-BASED EMERGENCY RESPONSE FLOOR IDENTIFICATION

BACKGROUND

The present invention relates to technology for finding people that are in need of rescue in buildings during emergency response situations. More particularly, the present invention relates to spatial device clustering-based emergency response floor identification.

Emergency response personnel respond to emergencies, and attempt to locate and rescue people that are in danger. The emergencies may include hurricanes, earthquakes, tornadoes, and other events that result in fires or other difficult rescue situations.

SUMMARY

A computer-implemented method includes receiving historical device positioning data captured from one or more devices over a period of time, where the historical device positioning data comprises historical latitude, longitude, and elevation data of the one or more devices; for a given building, identifying building boundaries based upon the historical latitude and longitude data; clustering the historical device positioning data corresponding to locations within the building boundaries of the building using a machine learning-based clustering algorithm, resulting in clusters with corresponding cluster centroids; associating the cluster centroids with respective floors within the building; and determining a current floor of the building on which a specific device is located by mapping current device positioning data of the specific device to the closest cluster centroid.

A system that performs the computer-implemented method and a computer program product that causes a computer to perform the computer-implemented method are also described.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides spatial device clustering-based emergency response floor identification. The present technology solves a recognized real-time floor identification problem during emergency response situations by providing a new form of computing system and computer-based processing that improve locating persons that are in need of rescue on different floors in buildings, such as within tall/high-rise structures and other multi-story buildings. By accurately identifying which different floors of a building upon which persons that are in need of rescue are located, the present technology can assist with saving lives of the persons that are in danger within buildings. Additionally, because the time required to identify and rescue the persons that are in danger is reduced by the technology described herein, the time that emergency response personnel are inside buildings during emergencies can be reduced, and as a result the technology described herein can assist with saving lives of emergency response personnel. As such, the technology described herein improves both emergency response safety and success at saving lives of all persons at emergency locations during emergency response situations.

Regarding certain terminology used herein, for purposes of the present subject matter a point of interest (POI) is considered to be a multi-story building, a sky scraper or other tall/high-rise structure, a tower, and any other multi-story structure of any type that is partitioned into different floors to which the technology described herein may be applied. As such, while the term and acronym point of interest (POI) are utilized for ease of reference herein, it is understood that this term and acronym represent different types of building structures. Further, a "device" for purposes of the present description may be considered any portable device, such as a mobile phone, laptop, watch, or other device that is capable of measuring and providing at least longitude, latitude, and elevation of the respective device both instantaneously in real time and over time to yield historical floor device location information. Longitude and latitude may be determined and provided by a device using global positioning system (GPS) technology, while elevation may be determined and provided by a device using barometric pressure, or other appropriate technologies as appropriate for a given implementation. It is understood that use of barometric pressure yields an approximation of elevation that can be mapped by the technology described herein to particular floors of a particular POI. By combining use of these types of technologies, both over time and instantaneously in real time, accurate floor locations of persons during emergency situations may be determined, as described herein.

The technology described herein operates by performing historical floor mapping of devices for different POIs over time. Floor mapping for a specific POI is based upon clustering of historical device data (e.g., latitude, longitude, elevation) captured and/or calculated over a period of time for multiple devices. The time period may be any time period appropriate for a given implementation, such as one month, multiple months, and one or more years.

The historical device latitude and longitude define a bounding box that identifies within the data the structural boundaries of the particular POI under evaluation. Queried device data (latitude, longitude, elevation) within this bounding box for the selected historical time window establish historical device location and travel pathways within particular floors of the POI.

From this selection of data points, outlying data points ("outliers") are removed. Removal of outliers may be performed by use of one or more outlier detection and filtration techniques. Removal of outlying data points improves clustering results, and the particular outlier detection and filtering techniques that are utilized may be selected as appropriate for a given implementation. The remnant data after removal of the outlying data points becomes the input of the clustering algorithm(s).

Clustering for each POI is performed using one or more machine learning-based algorithms. The machine learning-based algorithms that are utilized include vector quantization-based k-means clustering (hereinafter "k-means"), density-based spatial clustering of applications with noise (hereinafter "DBSCAN"), or a combination of such algorithms. The input of the algorithm is the historical device data for the specific POI. The output of the algorithm includes cluster centroids, where each centroid represents an estimated floor upon which the devices are historically located within the POI. The cluster centroids are output as both a spatial point and an index (e.g., a floor number), along with a corresponding cluster score that quantifies accuracy of the respective computed clusters.

To further describe computer-based implementation of these machine learning-based algorithms to the spatial device clustering-based emergency response floor identification described herein, K-means is a spatial clustering algorithm that, when given input data of the form described herein, yields a squared Euclidean distance measure that enables grouping of observed elevation values as "k" clusters, with each input value assigned to the cluster of the nearest mean (centroid). As described above, this cluster centroid is mapped historically to an indexed floor number.

DBSCAN is a spatial clustering algorithm that is somewhat noise tolerant and, when given input data of the form described herein, yields a distance measure that is chosen in a way that it gives precedence to tuples that evaluate within a very narrow epsilon neighborhood. Use of DBSCAN may be implemented to relax latitude and longitude because floor dimensions are invariably larger than floor height for a given POI.

As a result of application of these types of machine learning-based algorithms to the problem of spatial device clustering-based emergency response floor identification described herein, several properties of a POI may be programmatically derived. Specifically, dense clusters would be formed for points on floors. Very dense clusters would be formed in frequently visited places (e.g., a lobby, a conference halls, etc.). Ultra-dense clusters would be formed on floors that form a part of a building that is wider than the rest (e.g., lower floors of a high-rise are typically wider than the upper floors). Sparse clusters (outliers) would be formed elsewhere, and may be removed from the historical clustering or utilized, as appropriate for a given implementation.

With the historical clustering performed over any available time period prior to an emergency response situation, caller pinpointing to locate a caller in need of emergency assistance may be performed to determine in real-time the current floor upon which the caller is located. This real-time determination of the current floor upon which the caller is located may be performed by using the caller's device data (e.g., the caller's device latitude, longitude, and altitude) and mapping the caller's device data to the closest historical cluster centroid via a distance metric that allows selection among different clusters according to the particular historical clusters of the particular POI.

It should be understood that no clusters would be historically identified between floors of a particular POI for purposes of establishing clusters to which to map real-time callers during emergency situations. With this understanding, stairwells and elevator locations would be known to emergency response personnel, so any real-time caller device data that is located between centroids that represent floors may be leveraged to determine that the caller is in a stairwell or elevator.

The technology described herein operates by receiving historical device positioning data captured from one or more devices over a period of time, where the historical device positioning data comprises historical latitude, longitude, and elevation data of the one or more devices. For a given building, building boundaries are identified based upon the historical latitude and longitude data. The historical device positioning data corresponding to locations within the building boundaries of the building is clustered using a machine learning-based clustering algorithm, resulting in clusters with corresponding cluster centroids. The cluster centroids are associated with respective floors within the building. A current floor of the building on which a specific device is located is determined by mapping the specific device's current device positioning data to the closest cluster centroid.

It should be noted that conception of the present subject matter resulted from recognition of certain limitations associated with emergency response situations. For example, it was observed that emergency response systems (also termed "9-1-1" systems) have fallen behind in terms of accurately locating callers because the underlying location determination technology that is used relies primarily on system infrastructure that was built prior to the year 1996, which is before most mobile devices provided environmental sensing capabilities. In 2015, the Federal Communications Commission (FCC) published several rules for horizontal (x, y) and vertical (z) location requirements for locating callers when calls come into Public Safety Answering Points (PSAPs). However, it was determined that several outstanding issues still remain when it comes to computing an address to a dispatch location, particularly for callers that are trapped inside premises (e.g., buildings, malls, etc.). It was determined that technology that augments location determination with information from multiple sensors that are present on a caller's device in combination with historical device clustering information across multiple different floors of a building would improve real-time multi-floor device location-identification technology. The technology described herein provides a new method for improving floor calculations to further enhance location determination for address dispatch and emergency response personnel. This improvement is based on performing spatial device clustering based upon historical device data to determine accurate floor mapping for certain points of interest (POIs) during real-time emergency response situations. The present subject matter improves emergency response accuracy by providing for spatial device clustering-based emergency response floor identification, as described above and in more detail below.

As such, improved real-time emergency response safety and success may be obtained through use of the present technology.

The spatial device clustering-based emergency response floor identification described herein may be performed in real time to allow prompt identification of locations of persons that are in need of rescue on different floors of buildings. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Additional details of the algorithmic processing and computational efficiencies will be provided further below. The following portion of the present description provides examples of advanced computational platform(s) within which the present technology may be implemented, followed by further details of the spatial device clustering-based emergency response floor identification described herein.

It should be noted that the present technology may be implemented within or as part of a cloud computing environment (e.g., for data analytics), or may be implemented as a customized environment-specific solution. As such, examples of implementations for both environments are included herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
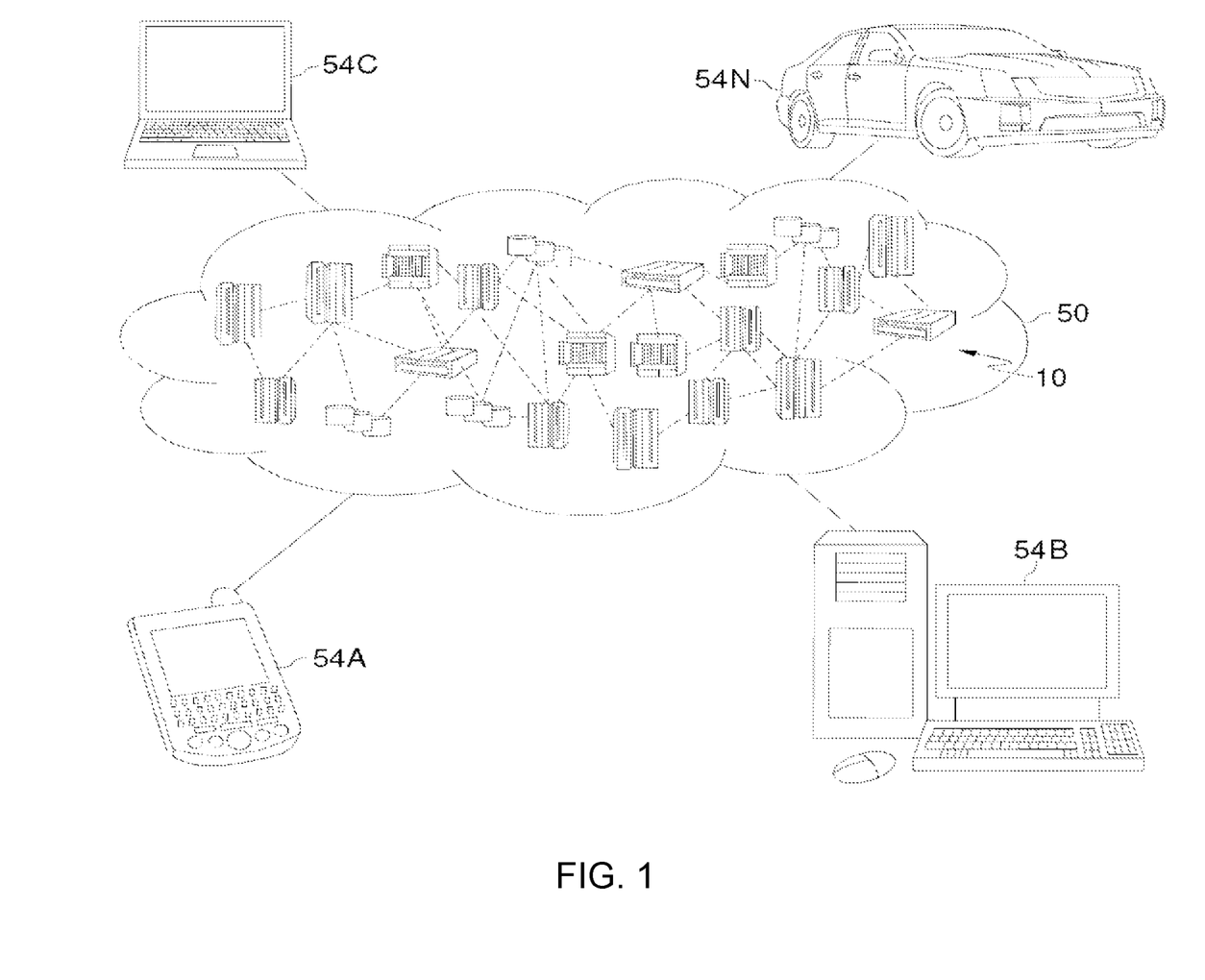
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
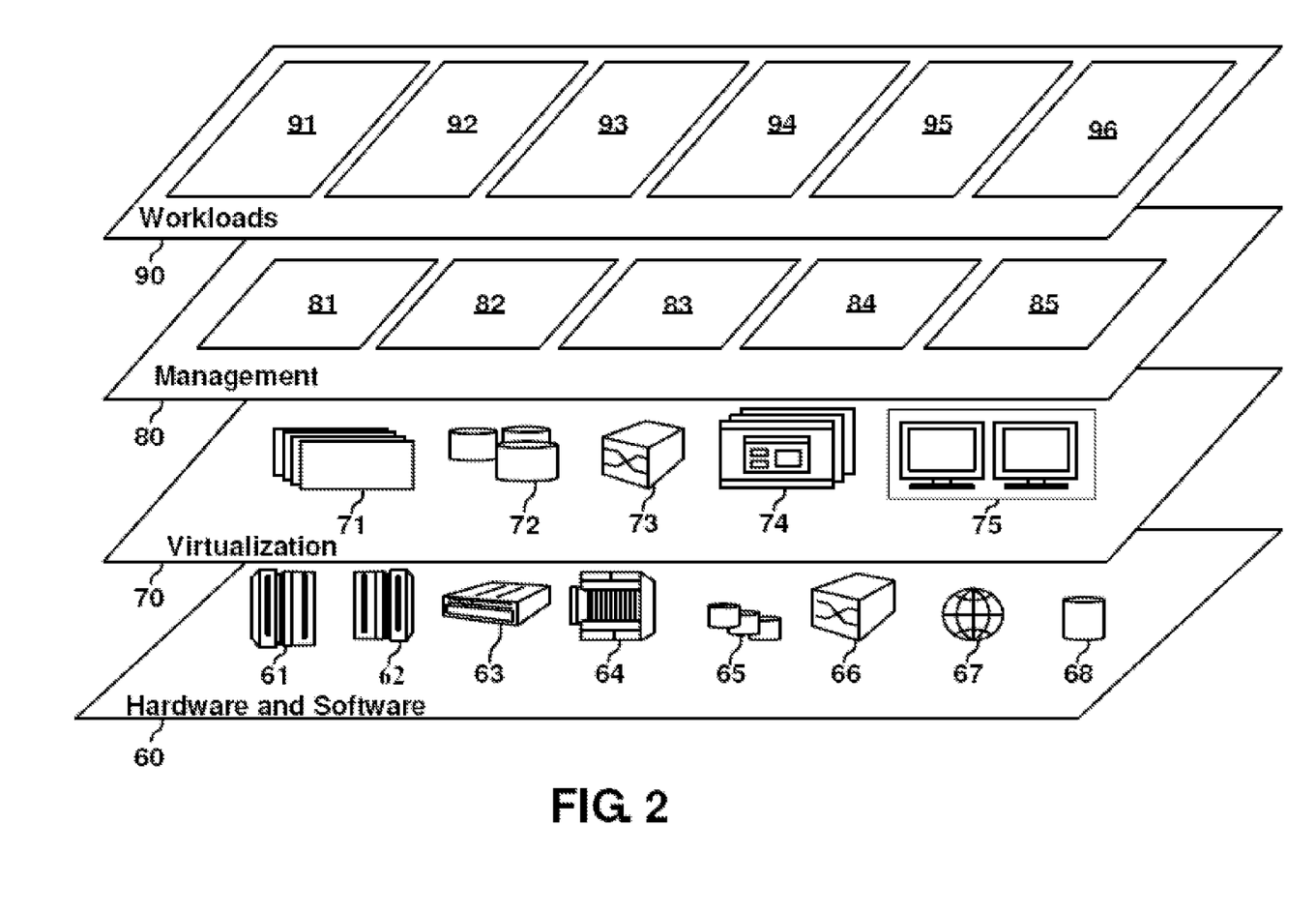
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and spatial device clustering-based emergency response floor identification 96.

Figure 3:
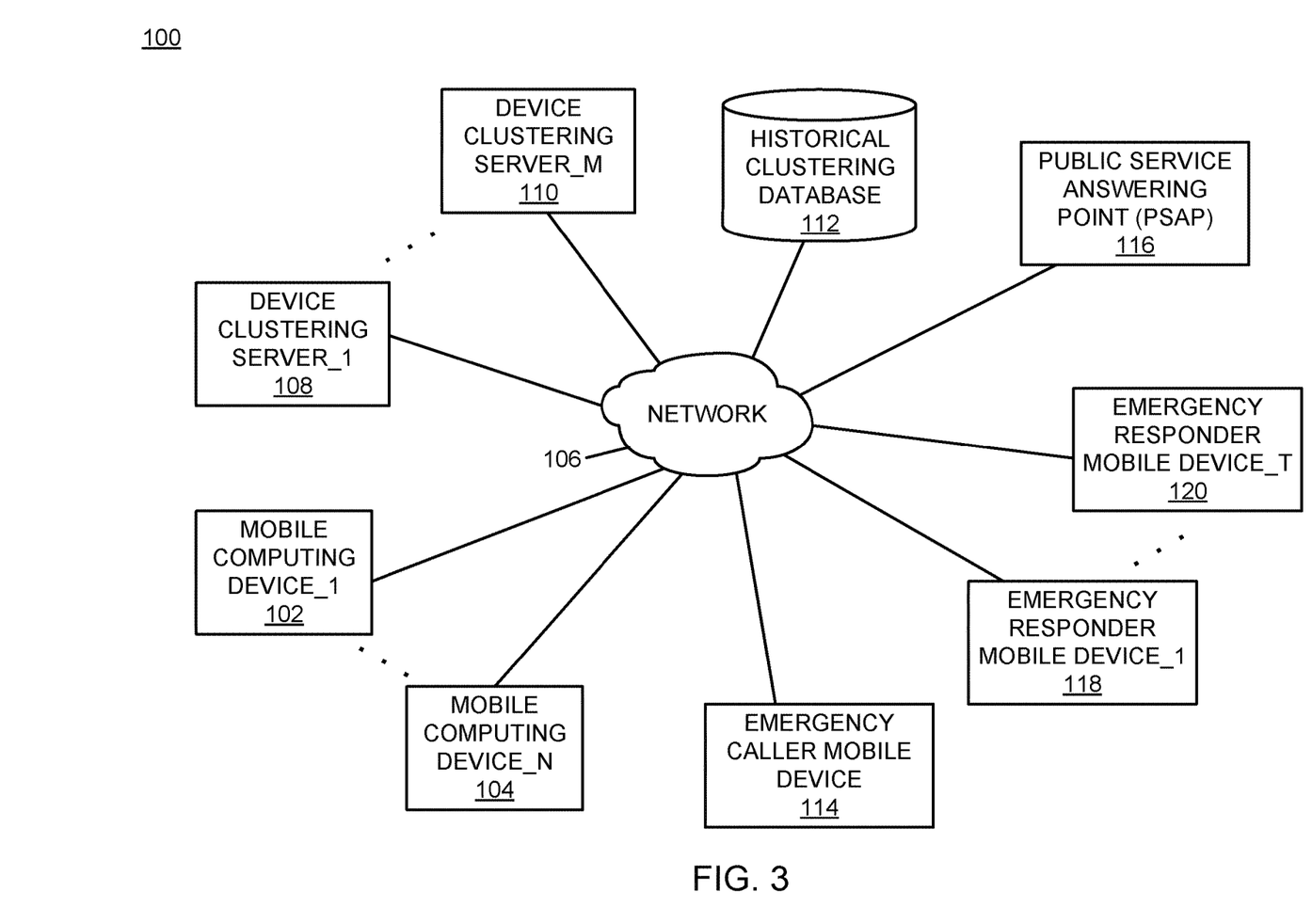
FIG. 3 is a block diagram of an example of an alternative system for spatial device clustering-based emergency response floor identification according to an embodiment of the present subject matter.

FIG. 3 is a block diagram of an example of an implementation of an alternative system 100 for spatial device clustering-based emergency response floor identification. A mobile computing device_1 102 through a mobile computing device_N 104 represent user devices that may be used by persons in a building. The mobile computing device_1 102 through the mobile computing device_N 104 can be cellular telephones, laptop computers, or other mobile devices that a user can use and carry within a building/POI. As such, the mobile computing device_1 102 through the mobile computing device_N 104 can be used as locatable mobile devices to determine locations of persons that are carrying or are near the respective devices.

The mobile computing device_1 102 through the mobile computing device_N 104 can communicate with other devices using a network 106. The other devices include one or more general servers, such as email servers, website servers, and other types of servers. These general servers are not separately illustrated within FIG. 3 to avoid crowding within the drawing, but are understood to form a portion of the system 100.

A device clustering server_1 108 through a device clustering server_M 110 utilize location-based technologies, such as information derived from or provided by the mobile computing device_1 102 through the mobile computing device_N 104, to establish device clusters and device cluster centroids within one or more POIs. As described above, the information derived from or provided by the mobile computing device_1 102 through the mobile computing device_N 104 can include latitude, longitude, and elevation. As also described above, floor mapping for a specific POI is based upon clustering of historical device data (e.g., latitude, longitude, elevation) captured and/or calculated over a period of time for multiple devices. The time period may be any time period appropriate for a given implementation, such as one month, multiple months, and one or more years.

A historical clustering database 112 stores device clustering information for POIs, as described above. The historical clustering database 112 can be utilized both to derive historical device data and to map real-time emergency response data into the historical device data set to allow specification of a particular floor upon which one or more emergency callers is/are located.

An emergency caller mobile device 114 represents one or more mobile devices similar to the mobile computing device_1 102 through the mobile computing device_N 104 that may be co-located with one or more emergency callers. The emergency caller mobile device 114 is illustrated separately within FIG. 3 to illustrate the following description of an emergency response situation.

Responsive to an emergency call from a user of the emergency caller mobile device 114, a public service answering point (PSAP) 116 is contacted. The PSAP 116 conveys the emergency to one or more emergency responders that carry one or more of emergency responder mobile device_1 118 through emergency responder mobile device_T 120. The emergency responders deploy to the specific POI at which the emergency situation is located.

Contemporaneously (in real-time) with the emergency call, location information associated with the emergency caller mobile device 114 is captured and utilized by one or more of the device clustering server_1 108 through the device clustering server_M 110 to identify the historical device clustering information stored within the historical clustering database 112 for the particular POI at which the emergency is located. The respective device clustering server(s) 108 through 110 map the device location data (again, latitude, longitude, and elevation) into the historical device data that documents historical device clusters and cluster centroids of the particular POI at which the emergency is located. The respective device clustering server(s) 108 through 110 then identify the nearest historical device cluster of the particular POI, and from a centroid of that cluster data determine and calculate the particular floor of the POI upon which the emergency caller is located.

As a result of this advanced real-time processing, the particular floor upon which the caller is located can be conveyed to the emergency responder(s) via the respective one or more of the emergency responder mobile device(s) 118 through 120 while the emergency responders are still in route to the POI. As a result, the emergency responders may be advised of the particular floor of the POI upon which the emergency caller is located prior to even arriving to the emergency. Accordingly, the emergency response personnel may immediately deploy the necessary ladder(s) and other related emergency response equipment that is particularly suited to the specific emergency situation and floor of the POI.

This real-time processing improves the technology of computer-based management of emergency response situations by providing technology and information that could not previously be derived or provided to emergency response personnel. As described above, the technology described herein can assist with saving lives of the persons that are in danger within buildings. Additionally, because the time required to identify and rescue the persons that are in danger is reduced by the technology described herein, the time that emergency response personnel are inside buildings during emergencies can be reduced, and as a result the technology described herein can assist with saving lives of emergency response personnel. As such, the technology described herein improves both emergency response safety and success at saving lives of all persons at emergency locations during emergency response situations.

While the system 100 of FIG. 3 has been described according to a particular set of interactions among devices, it should be understood that any of the mobile computing device_1 102 through the mobile computing device_N 104, and the device clustering server_1 108 through the device clustering server_M 110, may utilize the historical clustering database 112 (or other suitable platform) to each provide automated spatial device clustering-based emergency response floor identification. The automated spatial device clustering-based emergency response floor identification is based upon identification of historical device clusters in POIs in combination with technology that provides real-time device floor locations within particular POIs.

In view of the implementation alternatives described above, the present technology may be implemented within a cloud computing platform, at a user computing device, at a server device level, or by a combination of such platforms and devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The device clustering server_1 108 through the device clustering server_M 110 may include any device capable of providing data for consumption by a device, such as the mobile computing device_1 102 through the mobile computing device_N 104 and the emergency responder mobile device_1 118 though the emergency responder mobile device_T 120, via a network, such as the network 106. As such, the device clustering server_1 108 through the device clustering server_M 110 may each include a web server, application server, or other data server device.

The historical clustering database 112 may include a relational database, an object database, or any other storage type of device. As such, the historical clustering database 112 may be implemented as appropriate for a given implementation.

Figure 4:
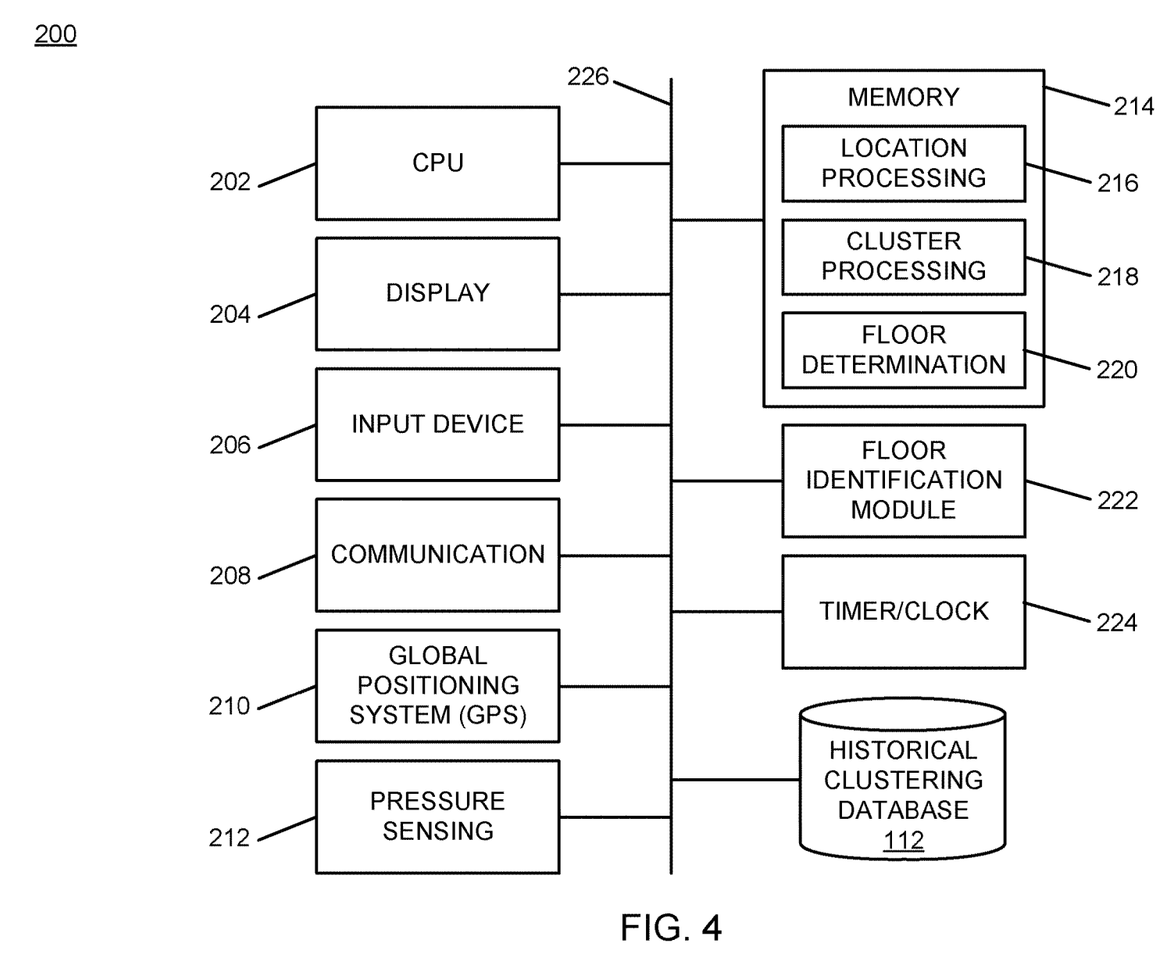
FIG. 4 is a block diagram of an example of an implementation of a core processing module capable of performing spatial device clustering-based emergency response floor identification according to an embodiment of the present subject matter.

FIG. 4 is a block diagram of an example of an implementation of a core processing module 200 capable of performing spatial device clustering-based emergency response floor identification. The core processing module 200 may be associated with either the mobile computing device_1 102 through the mobile computing device_N 104, with the device clustering server_1 108 through the device clustering server_M 110, with the PSAP 116, with the emergency responder mobile device_1 118 though the emergency responder mobile device_T 120, or with devices within the cloud computing environment 50, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 may provide different and complementary processing of spatial device clustering-based emergency response floor identification in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor" or "application-specific" processor) provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100, or within the cloud computing environment 50, as appropriate for a given implementation. The communication module 208 may include any electrical, protocol, and protocol conversion capabilities useable to provide interconnection capabilities, as appropriate for a given implementation. As such, the communication module 208 represents a communication device capable of carrying out communications with other devices. The communication module 208 may further include one or more wireless communication capabilities, as appropriate for the given implementation.

A global positioning system (GPS) module 210 provides positioning location coordinates usable for identifying latitude and longitude of mobile devices over time and in real time. The GPS module 210 may also be used to identify a physical and/or logical location of a mobile device.

A pressure sensing module 212 provides elevation measurements of mobile devices over time and in real time. The pressure sensing module 212 may use barometric pressure, or other appropriate technologies as appropriate for a given implementation, to determine an elevation of a mobile device.

A memory 214 includes a location processing storage area 216 that stores device location information (latitude, longitude, and elevation) during processing of either historical device location information for historical cluster identification or for real-time emergency device floor location processing in association with the core processing module 200. Location identification information generated by the GPS module 210 and elevation information generated by the pressure sensing module 212 may be stored within the location processing storage area 216.

A cluster processing storage area 218 provides computational and storage space for cluster identification and for cluster mapping during each of the historical cluster identification and real-time emergency response processing, respectively. A floor determination storage area 220 provides storage for device mappings of mobile devices (both historical and real-time) to different floors in one or more buildings.

It is understood that the memory 214 may include any combination of volatile and non-volatile memory suitable for the intended purpose, distributed or localized as appropriate, and may include other memory segments not illustrated within the present example for ease of illustration purposes. For example, the memory 214 may include a code storage area, an operating system storage area, a code execution area, and a data area without departure from the scope of the present subject matter.

A floor identification module 222 is also illustrated. The floor identification module 222 provides both historical and real-time device location processing for/within the core processing module 200, as described above and in more detail below. The floor identification module 222 implements the automated spatial device clustering-based emergency response floor identification of the core processing module 200.

It should also be noted that the floor identification module 222 may form a portion of other circuitry described without departure from the scope of the present subject matter. The floor identification module 222 may form a portion of an interrupt service routine (ISR), a portion of an operating system, or a portion of an application without departure from the scope of the present subject matter. The floor identification module 222 may also include an embedded device with circuitry designed specifically to perform the processing described herein as appropriate for a given implementation.

A timer/clock module 224 is illustrated and used to determine timing and date information, such as for historical and real-time mobile device location detection, as described above and in more detail below. As such, the floor identification module 222 may utilize information derived from the timer/clock module 224 for information processing activities, such as the spatial device clustering-based emergency response floor identification described herein.

The historical clustering database 112 is again shown within FIG. 4 associated with the core processing module 200. As such, the historical clustering database 112 may be operatively coupled to the core processing module 200 without use of network connectivity, as appropriate for a given implementation.

The CPU 202, the display 204, the input device 206, the communication module 208, the GPS module 210, the pressure sensing module 212, the memory 214, the floor identification module 222, the timer/clock module 224, and the historical clustering database 112 are interconnected via an interconnection 226. The interconnection 226 may include a system bus, a network, or any other interconnection capable of providing the respective components with suitable interconnection for the respective purpose.

Though the different modules illustrated within FIG. 4 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the historical clustering database 112 is illustrated as a separate component for purposes of example, the information stored within the historical clustering database 112 may also/alternatively be stored within the memory 214 without departure from the scope of the present subject matter. Accordingly, the core processing module 200 may take many forms and may be associated with many platforms.

Figure 5:
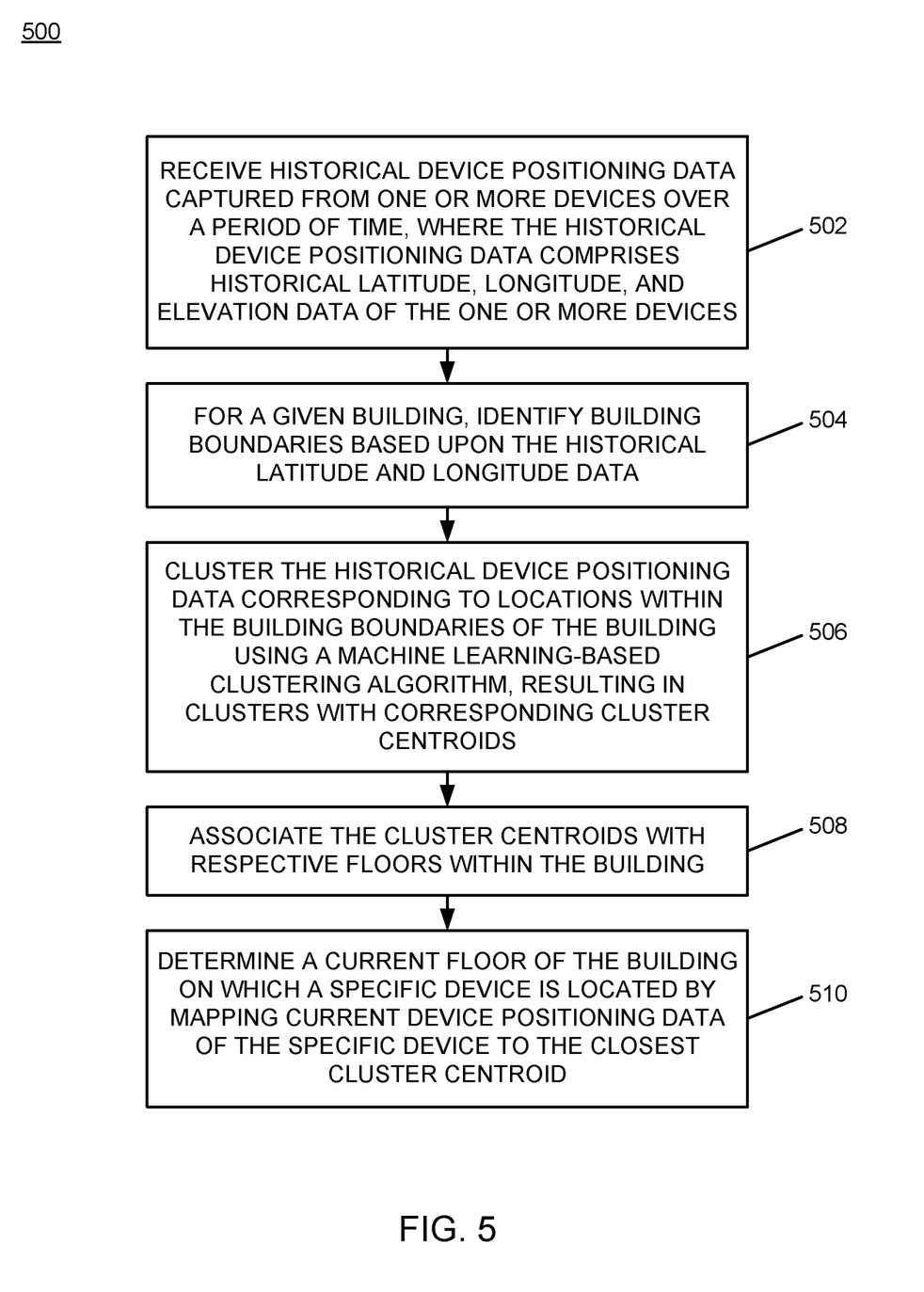
FIG. 5 is a flow chart of an example of an implementation of a process for spatial device clustering-based emergency response floor identification according to an embodiment of the present subject matter.
Figure 6:
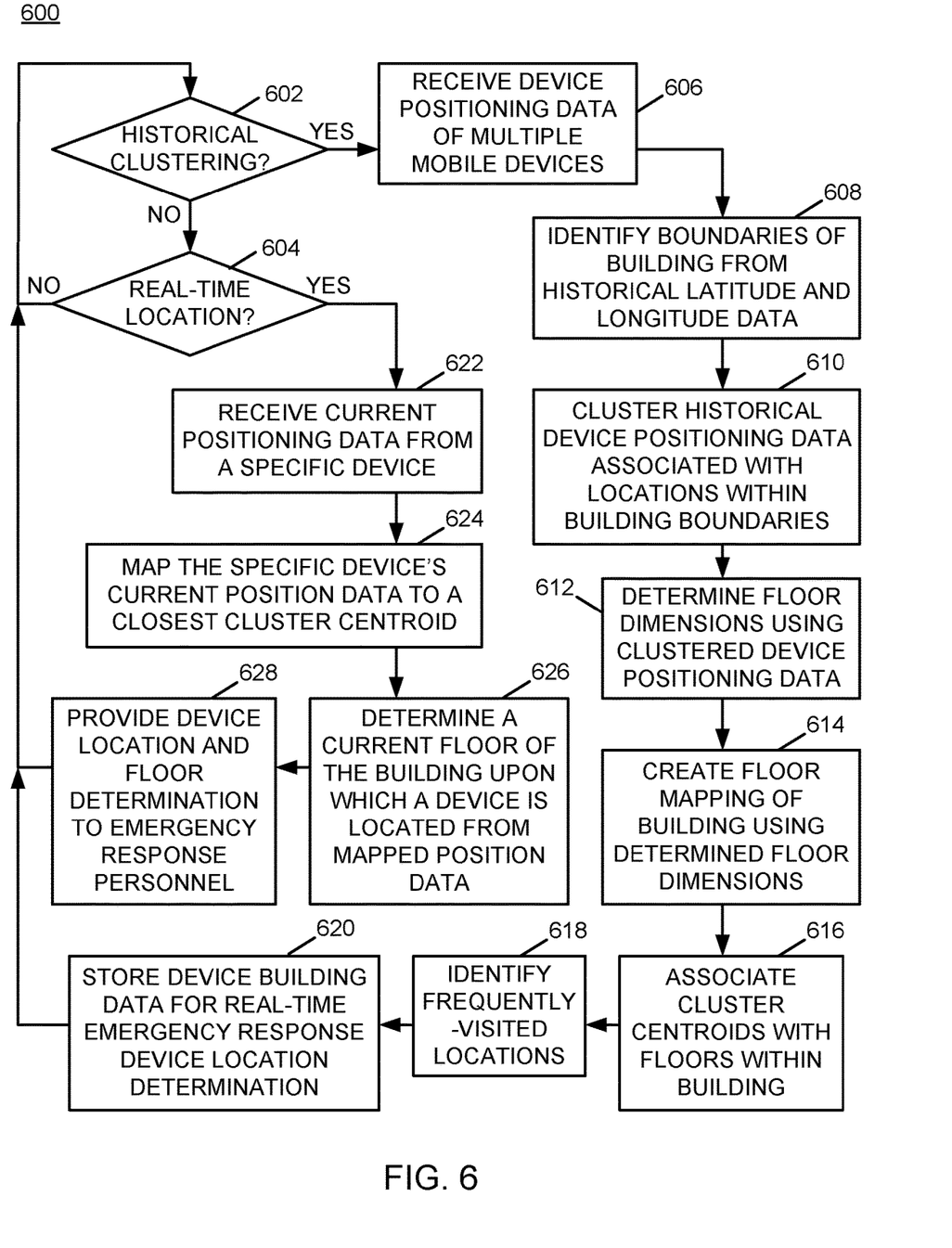
FIG. 6 is a flow chart of an example of an implementation of a process for spatial device clustering-based emergency response floor identification that shows additional details related to tracking devices over time and real-time response to emergency situations to identify device locations on different floors of a building according to an embodiment of the present subject matter.

FIG. 5 through FIG. 6 described below represent example processes that may be executed by devices, such as the core processing module 200, to perform the spatial device clustering-based emergency response floor identification associated with the present subject matter. Many other variations on the example processes are possible and all are considered within the scope of the present subject matter. The example processes may be performed by modules, such as the floor identification module 222 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 5 is a flow chart of an example of an implementation of a process 500 for spatial device clustering-based emergency response floor identification. The process 500 represents a computer-implemented method of performing the technical subject matter described herein. At block 502, the process 500 receives historical device positioning data captured from one or more devices over a period of time, where the historical device positioning data comprises historical latitude, longitude, and elevation data of the one or more devices. At block 504, the process 500, for a given building, identifies building boundaries based upon the historical latitude and longitude data. At block 506, the process 500 clusters the historical device positioning data corresponding to locations within the building boundaries of the building using a machine learning-based clustering algorithm, resulting in clusters with corresponding cluster centroids. At block 508, the process 500 associates the cluster centroids with respective floors within the building. At block 510, the process 500 determines a current floor of the building on which a specific device is located by mapping current device positioning data of the specific device to the closest cluster centroid.

FIG. 6 is a flow chart of an example of an implementation of a process 600 for spatial device clustering-based emergency response floor identification that shows additional details related to tracking devices over time and real-time response to emergency situations to identify device locations on different floors of a building. The process 600 represents a computer-implemented method of performing the technical subject matter described herein. The process 600 is illustrated and described with respect to a single building structure for ease of description. However, it is understood that the process 600 is considered to incorporate processing to perform both historical clustering analysis and real-time device location processing for multiple building structures without departure from the scope of the present description. As such, any reference to processing associated with particular devices and with a particular building within the description below is considered to be selectively applied to one of multiple devices and multiple buildings, as appropriate for the particular portion of the description. This additional selective processing is omitted only to reduce complexity within the drawing and description to focus on more technical details of the processing described. It should further be understood that the processing described below associated with historical clustering analysis may be performed over time and in real time as devices are detected to accumulate historical device cluster data over time, rather than post processing the device positioning data as a set.

At decision point 602, the process 600 begins iterative processing to perform both historical device clustering and real-time device floor location processing, as described below. The higher-level iterative processing is described below prior to describing details of the respective individual branches of processing.

As such, at decision point 602, the process 600 makes a determination as to whether to perform historical device clustering analysis. In response to determining not to perform historical device clustering analysis, the process 600 makes a determination at decision point 604 as to whether to perform real-time device floor location processing. In response to determining not to perform real-time device floor location processing, the process 600 returns to decision point 602 and iterates as described above. It should be understood that software programmed according to the processing described herein can be provided as a service in a cloud environment.

Returning to the description of decision point 602, in response to determining to perform historical device clustering analysis, the process 600 receives device positioning data of multiple mobile devices at block 606. As described above, the device positioning data can include latitude, longitude, and elevation data.

At block 608, the process 600 identifies boundaries of a particular building from the historical latitude and longitude data of the multiple mobile devices. At block 610, the process 600 clusters the device historical positioning data associated with locations within the identified building boundaries. This clustering includes three-dimensional (3D) clustering to facilitate determinations of inter-floor heights, which may be constant or may differ among different floors in a building. As described above, the process 600 can apply a machine learning-based clustering algorithm, such as vector quantization-based k-means clustering or density-based spatial clustering of applications with noise (DB-SCAN).

At block 612, the process 600 determines floor dimensions using the clustered device positioning data. The determined floor dimensions are 3D dimensions of the individual floors within the building. For example, the process 600 can utilize the results of the machine learning-based clustering algorithm to identify floors that are larger or smaller in horizontal dimensions than other floors in the building. Additionally, the results of the machine learning-based clustering algorithm can be utilized to identify floors that are larger or smaller in height than other floors of the building. As such, the process 600 builds a 3D representation of historical device clusters within the particular building, and again may do this for multiple buildings to build a historical 3D map/model of device cluster data for entire regions of buildings.

At block 614, the process 600 creates a floor mapping of the building using the determined horizontal floor dimensions. For example, the process 600 can identify dense 3D clusters that would be formed for points on floors. Similarly, very dense 3D clusters would be formed in frequently visited places (e.g., a lobby, a restroom, a conference hall, etc.). Ultra-dense 3D clusters would be formed on floors within part of a building that are wider than other floors of the building (e.g., lower floors of a skyscraper). Sparse 3D clusters (e.g., outliers) would be formed elsewhere, and may be considered or disregarded from further historical clustering analysis as appropriate for a given implementation. As such, from this historical device positioning analysis and information, the process 600 can identify a 3D profile of a building, including inter-floor heights that may differ within a building and across different buildings.

At block 616, the process 600 associates cluster centroids with floors in the building. At block 618, the process 600 identifies frequently-visited locations within the building (again, a lobby, a restroom, a conference hall, etc.). At block 620, the process 600 stores the device building data for real-time emergency response device location determination.

As such, from the stored device building data, the process 600 can utilize the results of the machine learning-based clustering algorithm to further identify a specific location of a specific device within a current floor of the building. The identified specific locations within the current floor of the building can include one or more frequently visited rooms. Further, the process 600 can determine a current floor of the building on which a specific device is located during an emergency by mapping the specific device's current device positioning data to the closest cluster centroid, as described in more detail below. The process 600 returns to decision point 602 and iterates as described above.

Returning to the description of decision point 604, the processing responsive to decision point 604 represents real-time processing during an emergency response situation. The processing described below may be performed concurrently for multiple devices in real time.

At decision point 604, in response to determining to perform real-time device floor location processing, the process 600 receives current positioning data (e.g., latitude, longitude, and elevation) from a specific mobile device at block 622. At block 624, the process 600 maps the specific device's current position data to a closest cluster centroid within the historical device cluster data associated with the particular building in which the mobile device is located. At block 626, the process 600 determines a current floor of the building on which a specific device is located from the mapped position data. As such, the process 600 again utilizes the results of the machine learning-based clustering algorithm to further identify a specific location of the specific device within the current floor of the building during an emergency response situation, and again the identified specific locations within the current floor of the building can include one or more frequently visited rooms. At block 628, the process 600 provides the device location and floor determination to emergency response personnel to allow the emergency response personnel to carry out rescue efforts as safely and quickly as possible during the emergency situation. The process 600 returns to decision point 602 at iterates as described above.

As such, the process 600 performs historical device clustering analysis to form a 3D model of device cluster data within a building, including both horizontal and vertical floor dimensions. During real-time emergency response situations, the process 600 receives current device positioning data of one or more devices within the building, and maps the current devices' position data into the historical device cluster data to provide an accurate position of mobile devices within the building. Emergency response personnel can then engage in rescue efforts with confidence that their own safety is improved by focusing their rescue efforts on the actual (verified) locations of persons with mobile devices in the building, and the safety of persons in need of rescue is improved by reducing the time required for the emergency response personnel to reach the persons in need of rescue.

Some embodiments of the present invention may improve the technology of computers in one, or more, of the following ways by: (i) improving real-time emergency response effectiveness; (ii) improving real-time emergency response personnel safety; and (iii) reducing time required to save people in large building structures during emergency response situations.

The present invention is not abstract because it relates particularly to computer operations and/or hardware for reasons that may include the following: (i) the computer-based machine-learning is applied to a specific problem of emergency response situations; (ii) the computer-based machine-learning saves lives of both persons in need of rescue in large buildings and of emergency response personnel that risk their lives to save persons in need of rescue; and (iii) the real-time computer processing is deployed within a complex computing environment that is enhanced with technological processing that could not be performed by prior conventional technologies.

As described above in association with FIG. 1 through FIG. 6, the example systems and processes provide spatial device clustering-based emergency response floor identification. Many other variations and additional activities associated with spatial device clustering-based emergency response floor identification are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
    receiving historical device positioning data captured from one or more devices over a period of time, where the historical device positioning data comprises historical latitude, longitude, and elevation data of the one or more devices within building boundaries of a building;
    performing machine learning operations utilizing a machine learning algorithm, where an input to the machine learning algorithm includes the historical device positioning data, where an output of the machine learning algorithm includes clusters with corresponding cluster centroids, and where the cluster centroids include spatial points in three-dimensional space;
    building a three-dimensional model of the building by associating the cluster centroids with respective floors within the building; and
    determining a current floor of the building on which a specific device is located by mapping current device positioning data of the specific device to the closest cluster centroid in the three-dimensional model;
    wherein the machine learning-based clustering algorithm includes a density-based spatial clustering of applications with noise (DBSCAN) algorithm.

2. The computer-implemented method of claim 1, further comprising utilizing the cluster centroids to identify specific locations within the respective floors within the building, including frequently visited rooms.

3. The computer-implemented method of claim 1, further comprising utilizing respective densities of the cluster centroids to identify floors that are larger in horizontal dimensions than other floors in the building.

4. The computer-implemented method of claim 1, where the machine learning-based clustering algorithm further includes a vector quantization-based k-means clustering algorithm.

5. The computer-implemented method of claim 1, where:
the current device positioning data of the specific device comprises current latitude, longitude, and elevation data of the specific device; and
determining the current floor of the building on which the specific device is located by mapping the current device positioning data of the specific device to the closest cluster centroid in the three-dimensional model comprises determining the current floor of the building on which the specific device is located during an emergency response situation.

6. The computer-implemented method of claim 1, where software programmed according to the computer-implemented method is provided as a service in a cloud environment.

7. A system, comprising:
a memory; and
a processor programmed to:
receive historical device positioning data captured from one or more devices over a period of time, where the historical device positioning data comprises historical latitude, longitude, and elevation data of the one or more devices within building boundaries of a building;
perform machine learning operations utilizing a machine learning algorithm, where an input to the machine learning algorithm includes the historical device positioning data, where an output of the machine learning algorithm includes clusters with corresponding cluster centroids, and where the cluster centroids include spatial points in three-dimensional space;
build a three-dimensional model of the building by associating the cluster centroids with respective floors within the building; and
determine a current floor of the building on which a specific device is located by mapping current device positioning data of the specific device to the closest cluster centroid in the three-dimensional model;
wherein the machine learning-based clustering algorithm includes a density-based spatial clustering of applications with noise (DBSCAN) algorithm.

8. The system of claim 7, where the processor is further programmed to utilize the cluster centroids to identify specific locations within the respective floors within the building, including frequently visited rooms.

9. The system of claim 7, where the processor is further programmed to utilize respective densities of the cluster centroids to identify floors that are larger in horizontal dimensions than other floors in the building.

10. The system of claim 7, where the machine learning-based clustering algorithm further includes a vector quantization-based k-means clustering algorithm.

11. The system of claim 7, where:
the current device positioning data of the specific device comprises current latitude, longitude, and elevation data of the specific device; and
in being programmed to determine the current floor of the building on which the specific device is located by mapping the current device positioning data of the specific device to the closest cluster centroid in the three-dimensional model, the processor is programmed to determine the current floor of the building on which the specific device is located during an emergency response situation.

12. A computer program product, comprising:
a computer readable storage medium having computer readable program code embodied therewith, where the computer readable storage medium is not a transitory signal per se and where the computer readable program code when executed on a computer causes the computer to:
receive historical device positioning data captured from one or more devices over a period of time, where the historical device positioning data comprises historical latitude, longitude, and elevation data of the one or more devices within building boundaries of a building;
perform machine learning operations utilizing a machine learning algorithm, where an input to the machine learning algorithm includes the historical device positioning data, where an output of the machine learning algorithm includes clusters with corresponding cluster centroids, and where the cluster centroids include spatial points in three-dimensional space;
build a three-dimensional model of the building by associating the cluster centroids with respective floors within the building; and
determine a current floor of the building on which a specific device is located by mapping current device positioning data of the specific device to the closest cluster centroid in the three-dimensional model;
wherein the machine learning-based clustering algorithm includes a density-based spatial clustering of applications with noise (DBSCAN) algorithm.

13. The computer program product of claim 12, where the computer readable program code when executed on the computer further causes the computer to utilize the cluster centroids to identify specific locations within the respective floors within the building, including frequently visited rooms.

14. The computer program product of claim 12, where the computer readable program code when executed on the computer further causes the computer to utilize respective densities of the cluster centroids to identify floors that are larger in horizontal dimensions than other floors in the building.

15. The computer program product of claim 12, where the machine learning-based clustering algorithm further includes a vector quantization-based k-means clustering algorithm.

16. The computer program product of claim 12, where:
the current device positioning data of the specific device comprises current latitude, longitude, and elevation data of the specific device; and
in causing the computer to determine the current floor of the building on which the specific device is located by mapping the current device positioning data of the specific device to the closest cluster centroid in the three-dimensional model, the computer readable program code when executed on the computer causes the computer to determine the current floor of the building on which the specific device is located during an emergency response situation.

17. The computer program product of claim 12, where software programmed to operate on the computer is provided as a service in a cloud environment.

18. The computer-implemented method of claim 1, further comprising performing additional machine learning operations utilizing the machine learning algorithm, where the input to the machine learning algorithm includes the current device positioning data, and where the output of the machine learning algorithm includes updated clusters with corresponding cluster centroids.

19. The computer-implemented method of claim 1, wherein mapping the current device positioning data of the specific device to the closest cluster centroid includes using a distance metric that allows selection among different clusters.

20. The computer-implemented method of claim 1, wherein at least the determining of the current floor of the building on which the specific device is located by mapping the current device positioning data of the specific device to the closest cluster centroid in the three-dimensional model occurs in real time, within a portion of a second.

* * * * *